United States Patent
Cai et al.

(10) Patent No.: US 8,619,764 B2
(45) Date of Patent: Dec. 31, 2013

(54) SYSTEM FOR MULTI-CHASSIS INTERCONNECTION AND METHOD FOR CHASSIS CONNECTION

(75) Inventors: Bangzhong Cai, Shanghai (CN); Siwei Wang, Shanghai (CN); Guoxing Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 13/168,199

(22) Filed: Jun. 24, 2011

(65) Prior Publication Data

US 2011/0249672 A1 Oct. 13, 2011

Related U.S. Application Data

(63) Continuation of application No. PCT/CN2009/076058, filed on Dec. 25, 2009.

(30) Foreign Application Priority Data

Dec. 25, 2008 (CN) .......................... 2008 1 0241051

(51) Int. Cl.
| | |
|---|---|
| H04Q 11/00 | (2006.01) |
| H04L 1/00 | (2006.01) |
| H04L 12/26 | (2006.01) |
| H04L 12/50 | (2006.01) |
| H04J 1/16 | (2006.01) |
| H04J 3/14 | (2006.01) |
| G01R 31/08 | (2006.01) |
| G06F 11/00 | (2006.01) |
| G08C 15/00 | (2006.01) |

(52) U.S. Cl.
USPC ............ 370/388; 370/216; 370/357; 370/386

(58) Field of Classification Search
USPC .................................. 370/216, 357, 386, 388
See application file for complete search history.

(56) References Cited

U.S. PATENT DOCUMENTS 7,552,262 B1 * 6/2009 Turner et al. .................. 710/302

FOREIGN PATENT DOCUMENTS

| CN | 1878067 A | 12/2006 |
|---|---|---|
| CN | 1889483 A | 1/2007 |

(Continued)

OTHER PUBLICATIONS

First Chinese Office Action dated (mailed) Jul. 14, 2010, issued in related Chinese Application No. 200810241051.8 Huawei Technologies Co., Ltd.

(Continued)

*Primary Examiner* — Noel Beharry
*Assistant Examiner* — Kodzovi Acolatse
(74) *Attorney, Agent, or Firm* — Leydig, Voit & Mayer, Ltd.

(57) ABSTRACT

A system for multi-chassis interconnection and a method for chassis connection are disclosed. The system includes at least three chassis; each chassis includes a first switch fabric unit (SFU) and a second SFU; the first SFU in the first chassis is connected to the first SFU in other chassis; and the second SFU in the second chassis is connected to the second SFU in other chassis. In the embodiments of the present invention, different SFUs in the chassis of the multi-chassis interconnection system are connected to different main chassis, thus overcoming the technical defect in the prior art that other chassis in the multi-chassis interconnection system are unable to exchange data when the main chassis is faulty. Therefore, in the embodiments of the present invention, other chassis in the multi-chassis interconnection system can still exchange data normally when the main chassis is faulty.

2 Claims, 5 Drawing Sheets

(56) References Cited

FOREIGN PATENT DOCUMENTS

| CN | 1937782 A | 3/2007 |
|---|---|---|
| CN | 101150413 A | 3/2008 |
| CN | 101447941 A | 6/2009 |
| WO | WO2009/055982 A1 | 5/2009 |
| WO | WO2010/072175 A1 | 1/2010 |

OTHER PUBLICATIONS

Second Chinese Office Action dated (mailed) May 24, 2011, issued in related Chinese Application No. 200810241051.8 Huawei Technologies Co., Ltd.

Written Opinion of the International Searching Authority (translation) dated (mailed) Apr. 1, 2010, issued in related Application No. PCT/CN2009/076058, filed Dec. 25, 2009, Huawei Technologies Co., Ltd.

International Search Report for International Application No. PCT/CN2009/076058, mailed Apr. 1, 2010 Huawei Technologies Co., Ltd.

Chinese Office Action (partial translation), issued in reference to Application No. 200810241051.8, dated (mailed) Nov. 24, 2011.

Third Chinese Office Action of related Chinese Application No. 200810241051.8 dated Aug. 31, 2011.

Extended European Search report issued in related EP 09834128.2 dated Dec. 1, 2011.

\* cited by examiner

SYSTEM FOR MULTI-CHASSIS INTERCONNECTION AND METHOD FOR CHASSIS CONNECTION

CROSS-REFERENCE TO RELATED APPLICATIONS

This application is a continuation of International Application No. PCT/CN2009/076058, filed on Dec. 25, 2009, which claims priority to Chinese Patent Application No. 200810241051.8, filed on Dec. 25, 2008, both of which are hereby incorporated by reference in their entireties.

TECHNICAL FIELD

The present invention relates to the communication field, and in particular, to a system for multi-chassis interconnection and a method for chassis connection.

BACKGROUND

When core network devices are interconnected, it is necessary to interconnect multiple chassis. Generally, chassis are required to work without interruption even in the case of being faulty or under maintenance, which imposes high requirements on the reliability and maintainability of the core network devices. In the prior art, two or more switch fabric units (SFUs) for interconnecting chassis are configured in each chassis to avoid service interruption in the case that the chassis is faulty or under maintenance.

Currently, interconnected chassis are distributed in a star structure. That is, in all chassis to be interconnected, one is a main chassis, and others are all connected to the main chassis. Through the main chassis, the whole network is connected, and data is exchanged between chassis. Generally, two SFUs for exchanging data between chassis are configured in each chassis. All boards in this chassis perform data exchanging with the boards in other chassis through the SFUs. One SFU of each chassis is connected to one SFU of the main chassis to form a communication plane; and another SFU of each chassis is connected to another SFU of the main chassis to form another communication plane. The two planes work in an active/standby mode to improve the reliability of the system.

In the existing connection mode, all chassis perform data exchanging through a main chassis. If the main chassis is faulty or under maintenance and the whole chassis needs to be powered off, all chassis are disconnected, and the data exchanging between the chassis fails, which seriously affects the service. Therefore, this connection mode is defective in terms of reliability and maintainability; meanwhile, the load on the main chassis is increased because all chassis are interconnected through the main chassis.

SUMMARY

Considering that multiple chassis in a multi-chassis interconnection system are disconnected and that the data exchanging fails when the main chassis is faulty in the prior art, the aspects of the present invention provide a system for multi-chassis interconnection and a method for chassis connection, so that other chassis in the multi-chassis interconnection system can exchange data normally when the main chassis is faulty.

The aspects of the present invention provide a system for multi-chassis interconnection, where the system for multi-chassis interconnection includes at least three chassis. Each chassis includes a first SFU and a second SFU. The first SFU in the first chassis is connected to the first SFU in other chassis; and the second SFU in the second chassis is connected to the second SFU in other chassis.

A method for connecting chassis in a multi-chassis interconnection system is provided in an aspect of the present invention. Each chassis includes a first SFU and a second SFU. The method includes: connecting the first SFU in a first chassis to the first SFU in other chassis in the multi-chassis interconnection system; and connecting the second SFU in a second chassis to the second SFU in other chassis in the multi-chassis interconnection system.

In the aspects of the present invention, different SFUs in the chassis of the multi-chassis interconnection system are connected to different main chassis, thus overcoming the technical defect in the prior art that other chassis in the multi-chassis interconnection system are unable to exchange data normally when the main chassis is faulty. Therefore, in the embodiments of the present invention, other chassis in the multi-chassis interconnection system can still exchange data normally when the main chassis is faulty, and the working load of the main chassis can be distributed.

BRIEF DESCRIPTION OF THE DRAWINGS

The drawings outlined below are intended to give a thorough understanding of the present invention. As a part of this application, the drawings shall not be construed as limitations to the present invention.

DETAILED DESCRIPTION OF THE EMBODIMENTS

To make the objectives, technical solutions, and merits according to the present invention clearer, the following describes the embodiments of the present invention in detail with reference to accompanying drawings. The exemplary embodiments of the present invention and the description thereof are illustrative in nature, and shall not be construed as limitations to the present invention.

Figure 1:
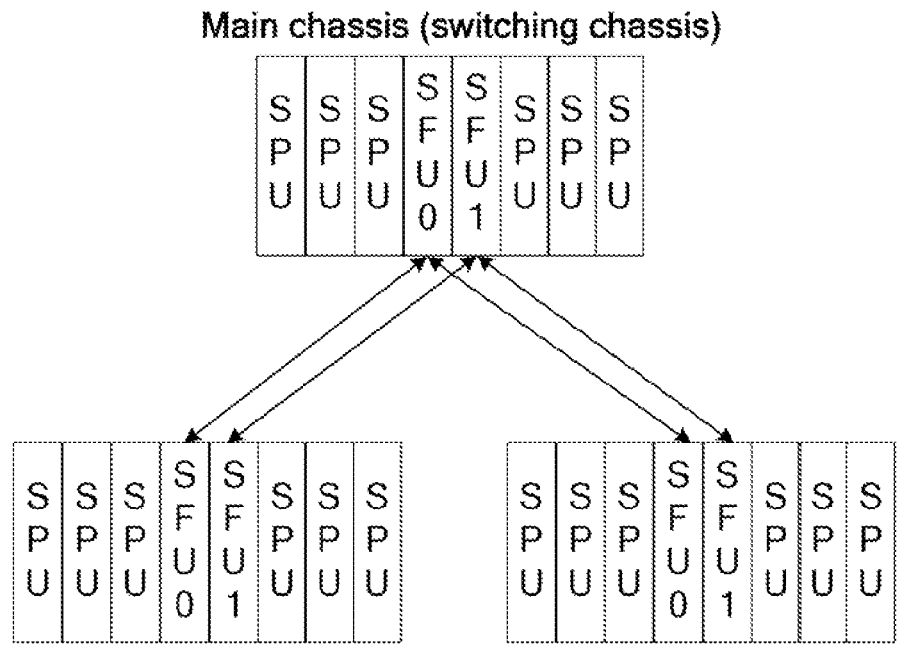
FIG. 1 is a schematic diagram showing connections between chassis in a multi-chassis interconnection system in the prior art.
Figure 2:
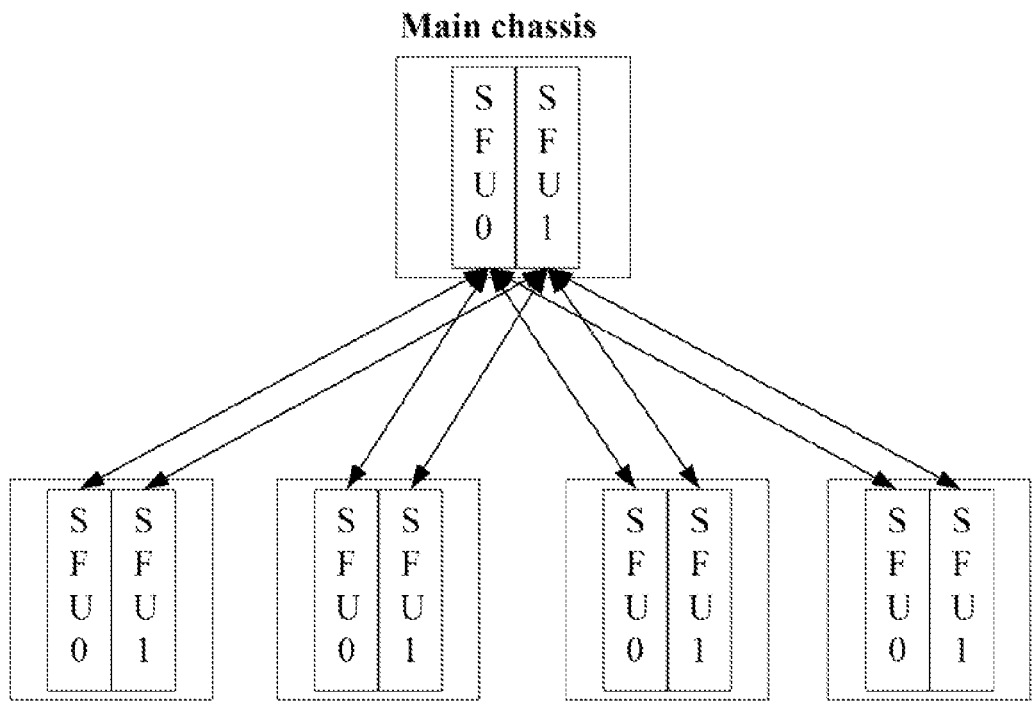
FIG. 2 is a schematic diagram showing connections between chassis in another multi-chassis interconnection system in the prior art.

Currently, interconnected chassis are distributed in a star structure. As shown in FIG. 1, in all chassis to be interconnected, one is a main chassis, and others are all connected to the main chassis. Through the main chassis, the whole network is connected, and data is exchanged between chassis. As shown in FIG. 2, the SFU 0 of each chassis is connected to the SFU 0 of the main chassis to form a communication plane; and the SFU 1 of each chassis is connected to the SFU 1 of the main chassis to form another communication plane. The two planes work in an active/standby mode to improve the reliability of the system.

Embodiment 1

Figure 3:
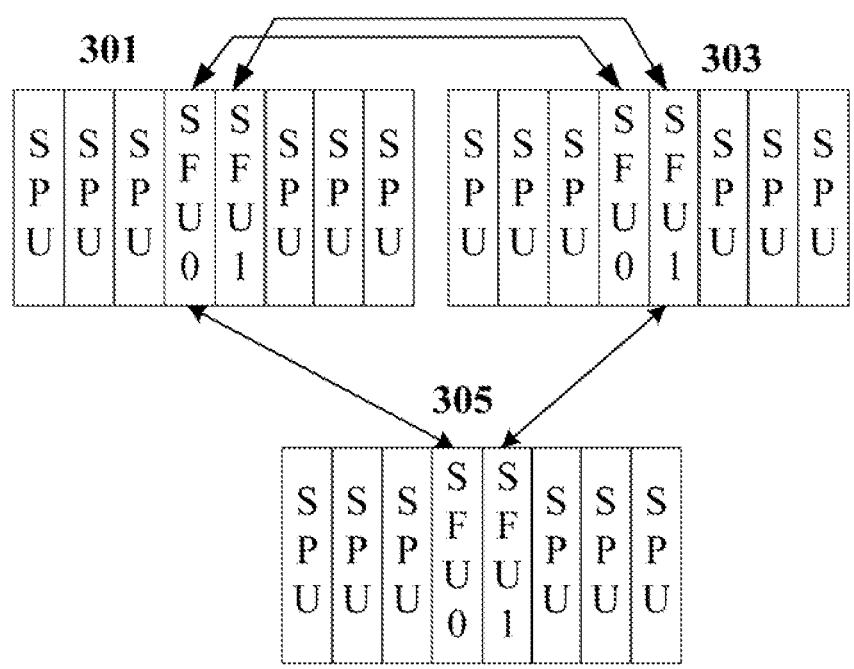
FIG. 3 is a schematic diagram showing a connection relations in a multi-chassis interconnection system according to an embodiment of the present invention.

FIG. 3 is a schematic diagram showing a connection relation in a multi-chassis interconnection system according to an embodiment of the present invention. The system includes at least three chassis; each of the at least three chassis includes a first SFU and a second SFU; the first SFU and the second SFU are designed for external communication of the whole chassis; a first SFU in the first chassis is connected to a first SFU in other chassis; and a second SFU in the second chassis is connected to a second SFU in other chassis.

In embodiments of the present invention, it is assumed that the multi-chassis interconnection system includes three chassis. In other embodiments of the present invention, the multi-chassis interconnection system may include more than three (such as 8 or 10) chassis. As shown in FIG. 3, the multi-chassis interconnection system includes a first chassis 301, a second chassis 303, and a third chassis 305. Each chassis includes a first SFU 0, a second SFU 1 and six service processing units (SPUs).

The first SFU 0 in the first chassis 301 is connected to the first SFU 0 in the second chassis 303 and the first SFU 0 in the third chassis 305 respectively.

The second SFU 1 in the second chassis 303 is connected to the second SFU 1 in the first chassis 301 and the second SFU 1 in the third chassis 305 respectively.

In this embodiments of the present invention, if the first chassis 301 is faulty or under maintenance and the whole chassis needs to be powered off, other chassis can still communicate with each other through the SFU of the second chassis 303.

In this embodiment of the present invention, different SFUs in the chassis of the multi-chassis interconnection system are connected to different main chassis, thus overcoming the technical defect in the prior art that other chassis in the multi-chassis interconnection system are unable to exchange data when the main chassis is faulty. Therefore, in the embodiments of the present invention, other chassis in the multi-chassis interconnection system can still exchange data normally when the main chassis is faulty.

In this embodiment of the present invention, a level-1 network may include at least three chassis, and the first chassis 301 and the second chassis 303 are main chassis of the level-1 network.

In this embodiment of the present invention, the multi-chassis interconnection system may include a level-2 network. The level-2 network includes at least three chassis, and each of the at least three chassis may include a first SFU and a second SFU that are designed for external communication of the whole chassis. Any two chassis except the main chassis 301 and 303 in the level-1 network serve as the first main chassis and the second main chassis in the level-2 network respectively, and are interconnected (the level-1 network includes at least four chassis in this embodiment). A first SFU in the first main chassis is connected to a first SFU of other chassis in the level-2 network; and a second SFU in the second main chassis is connected to a second SFU of other chassis in the level-2 network.

In this embodiment of the present invention, the level-2 network may include a random number of chassis, such as 3, 5, or 10 chassis.

Figure 4:
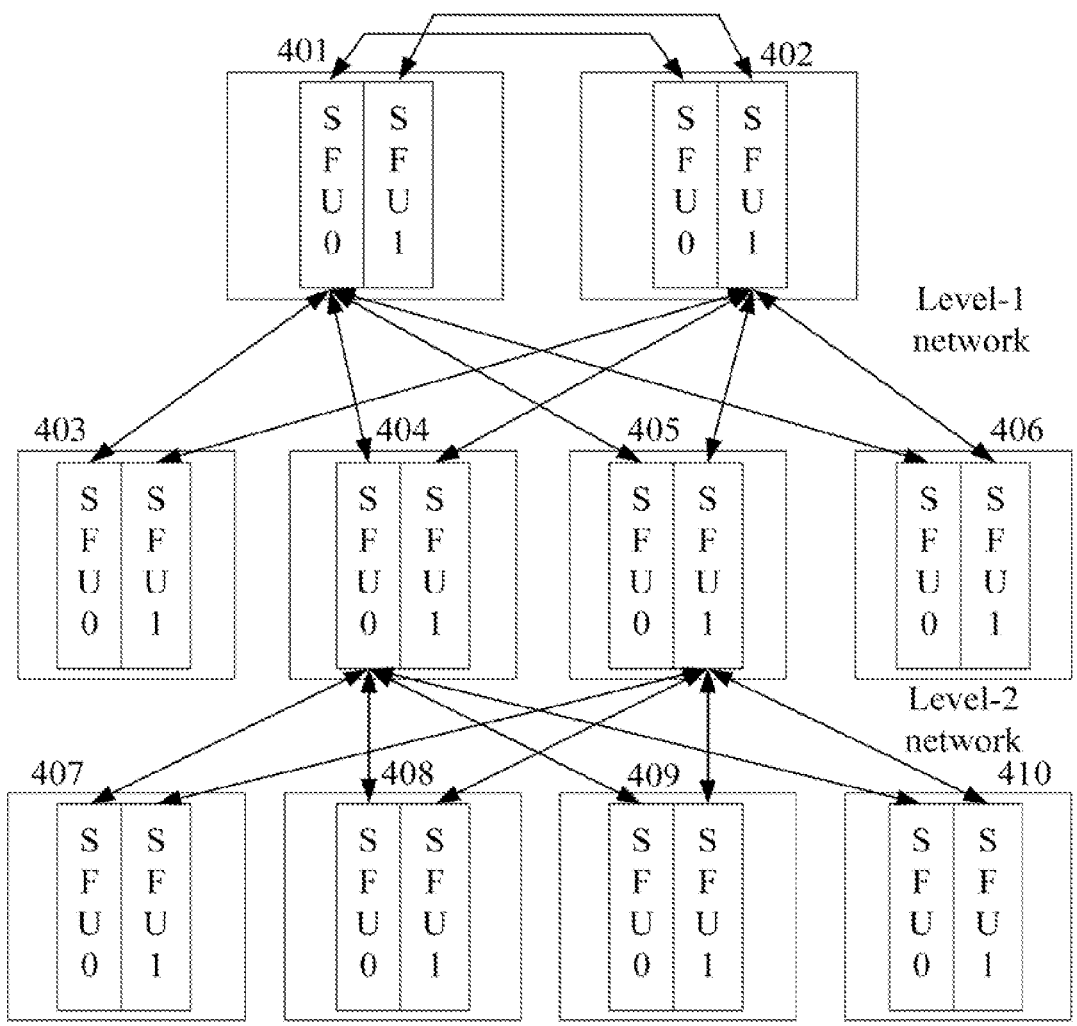
FIG. 4 is a schematic diagram showing a connection relation in a multi-chassis interconnection system according to an embodiment of the present invention.

FIG. 4 is a schematic diagram showing a connection relation in a multi-chassis interconnection system according to an embodiment of the present invention. As shown in FIG. 4, the multi-chassis interconnection system includes a level-1 network and a level-2 network. The level-1 network includes a first chassis 401, a second chassis 402, a third chassis 403, a fourth chassis 404, a fifth chassis 405, and a sixth chassis 406; the level-2 network includes a seventh chassis 407, an eighth chassis 408, a ninth chassis 409, and a tenth chassis 410; and each chassis includes an SFU 0 and an SFU 1.

In this embodiment, the first chassis 401 and the second chassis 402 serve as the main chassis of the level-1 network; the SFU 0 in the first chassis 401 is connected to the SFU 0 in the other five chassis in the level-1 network to form a level-1 network on a plane 0. In this way, the first chassis 401 is a main node chassis of the level-1 network on the plane 0, and other chassis are ordinary node chassis of the level-1 network on the plane 0. The SFU 1 in the second chassis 402 is connected to the SFU 1 in other five chassis in the level-1 network to form a level-1 network on a plane 1. In this way, the second chassis 402 is a main node chassis of the level-1 network on the plane 1, and other chassis are ordinary node chassis of the level-1 network on the plane 1. Multiple chassis in the level-1 network may communicate with each other through the SFU 0 in the first chassis 401 or through the SFU 1 in the second chassis 402.

In the embodiment, the fourth chassis 404 and the fifth chassis 405 in the level-1 network are connected to a level-2 network, and serve as main chassis of the level-2 network; the SFU 0 in the fourth chassis 404 is connected to the SFU 0 of other chassis in the level-2 network, and the SFU 1 in the fifth chassis 405 is connected to the SFU 1 of other chassis in the level-2 network. Multiple chassis in the level-2 network may communicate with each other through the SFU 0 in the fourth chassis 404 or through the SFU 1 in the fifth chassis 405. In this way, a level-2 network on a plane 0 and a level-2 network on a plane 1 are formed. The fourth chassis 404 and the fifth chassis 405 are the main node chassis of the level-2 network on the plane 0 and the level-2 network on the plane 1 respectively, and other chassis are the ordinary node chassis.

In this embodiment, 10 chassis are interconnected. As shown in FIG. 4, any two chassis are interconnected through two data paths for exchanging data, namely, a plane-0 network and a plane-1 network. The fault of any chassis (such as power-off or replacement of the whole chassis) affects only one plane. In this way, the data exchanging can still continue between any two chassis except the faulty chassis.

The following describes how a multi-chassis interconnection system formed through the method for chassis connection disclosed herein avoids communication interruption caused by chassis faults, supposing that a chassis in the multi-chassis interconnection system is faulty.

As shown in FIG. 4, when the whole chassis is faulty:

Supposing that the sixth chassis 406 (which is an ordinary node chassis) is faulty, because the communication between other chassis is independent of the sixth chassis 406, the fault of the sixth chassis 406 affects only the service of the sixth chassis 406.

Figure 6:
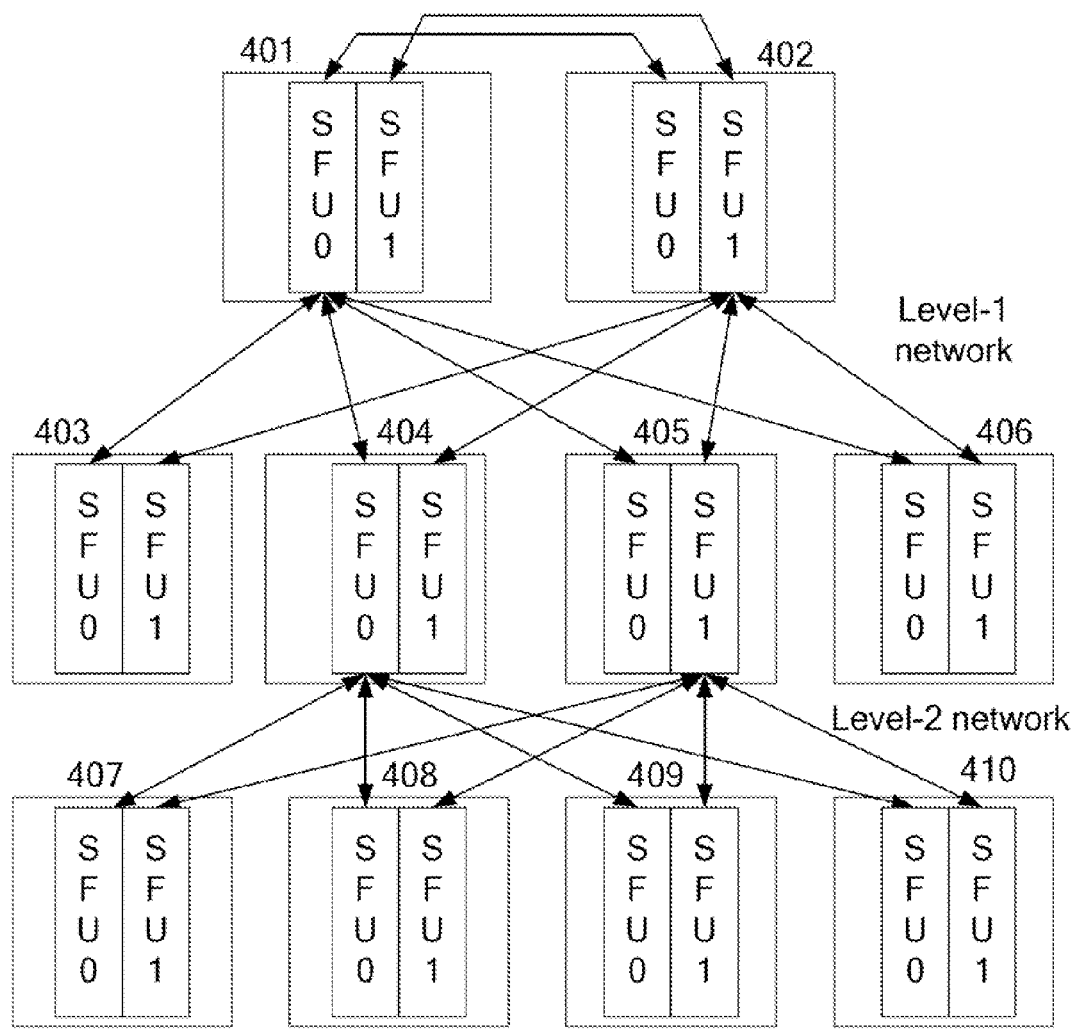
FIG. 6 is a schematic diagram showing connection relations in a multi-chassis interconnection system when a level-2 network main node chassis 404 of the multi-chassis interconnection system is faulty according to an embodiment of the present invention.

FIG. 6 is a schematic diagram showing a connection relation in a multi-chassis interconnection system when a level-2 network main node chassis 404 of the multi-chassis interconnection system is faulty according to an embodiment of the present invention. It is assumed that the faulty chassis is a main node chassis of the level-2 network and that the fourth chassis 404 is faulty. As shown in FIG. 6, when the fourth chassis 404 is faulty, the communication of the plane-0 network is interrupted between the seventh chassis 407, the eighth chassis 408, the ninth chassis 409, and the tenth chassis 410 that are dependent on the fourth chassis 404; but the communication is normal between the first chassis 401, the second chassis 402, the third chassis 403, the fifth chassis 405, and the sixth chassis 406. However, in the plane-1 network, the fourth chassis 404 is only an ordinary node chassis, which does not affect the communication between other chassis. Therefore, the communication can still be normal between the seventh chassis 407, the eighth chassis 408, the ninth chassis 409, and the tenth chassis 410 on the plane 1, thus preventing from affecting data exchanging in the level-2 network due to the fault of the fourth chassis 404.

Figure 7:
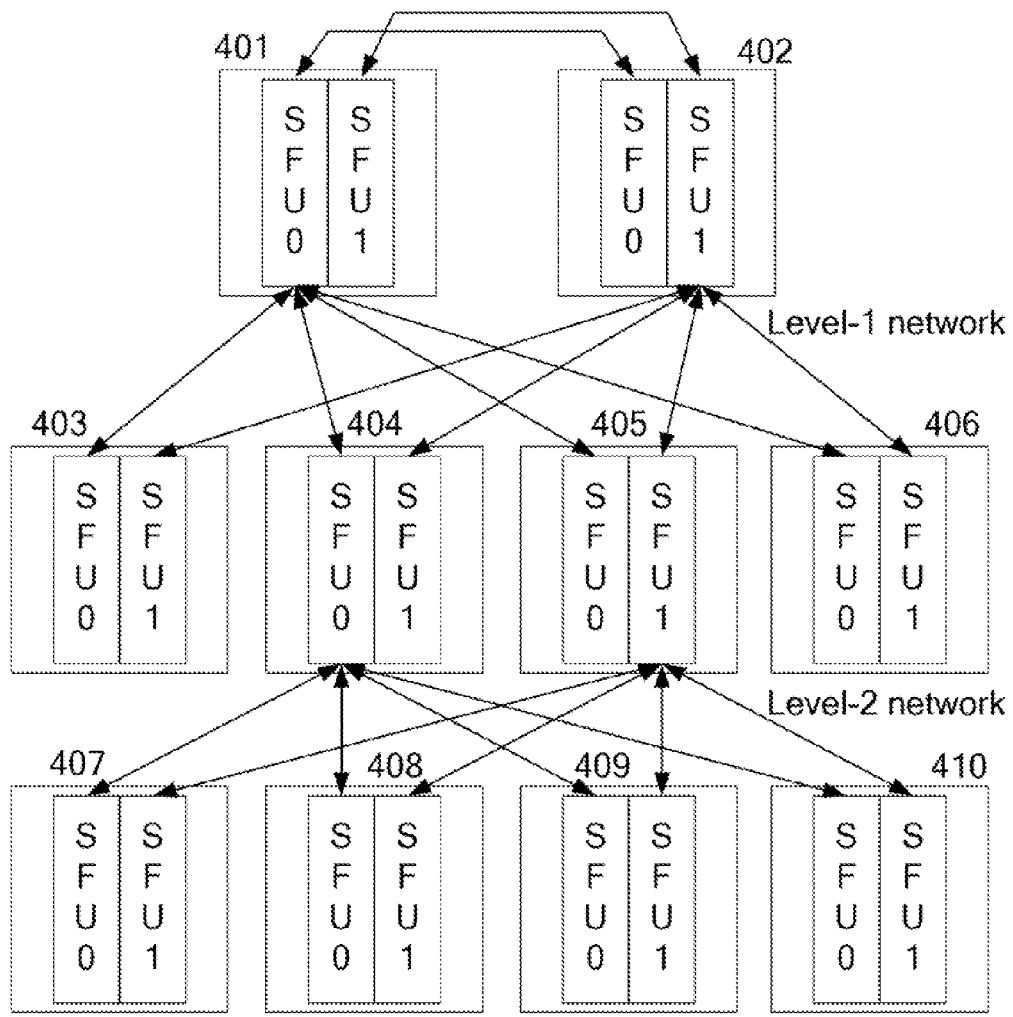
FIG. 7 is a schematic diagram showing a connection relation in a multi-chassis interconnection system when a level-1 network main node chassis 401 of the multi-chassis interconnection system is faulty according to an embodiment of the present invention.

FIG. 7 is a schematic diagram showing connection relations in a multi-chassis interconnection system when a level-1 network main node chassis 401 of the multi-chassis interconnection system is faulty according to an embodiment of the present invention. It is assumed that the faulty chassis is a main node chassis of the level-1 network and that the first chassis 401 is faulty. As shown in FIG. 7, when the first chassis 401 is faulty, the communication of the plane-0 network is interrupted between the second chassis 402, the third chassis 403, the fourth chassis 404, the fifth chassis 405, and the sixth chassis 406 that are dependent on the first chassis 401; but the communication is normal between the fourth chassis 404, the seventh chassis 407, the eighth chassis 408, the ninth chassis 409, and the tenth chassis 410. However, in the plane-1 network, the first chassis 401 is only an ordinary node chassis, which does not affect the communication between other chassis. Therefore, the communication is still normal between the second chassis 402, the third chassis 403, the fourth chassis 404, the fifth chassis 405, and the sixth chassis 406 on the plane 1, thus preventing from affecting data exchanging between other chassis due to the fault of the first chassis 401.

In this embodiment of the present invention, the fault of any chassis affects only the faulty chassis itself, and does not affect other chassis. According to embodiments of the present invention, backup for the functions of the main chassis is implemented by only changing the mode of interconnection between multiple chassis, the service interruption caused by the fault or maintenance of the main chassis is prevented, and the reliability and maintainability of the system are improved. Meanwhile, two chassis share the work of one main chassis, relieving the load on the main chassis.

Embodiment 2

Figure 5:
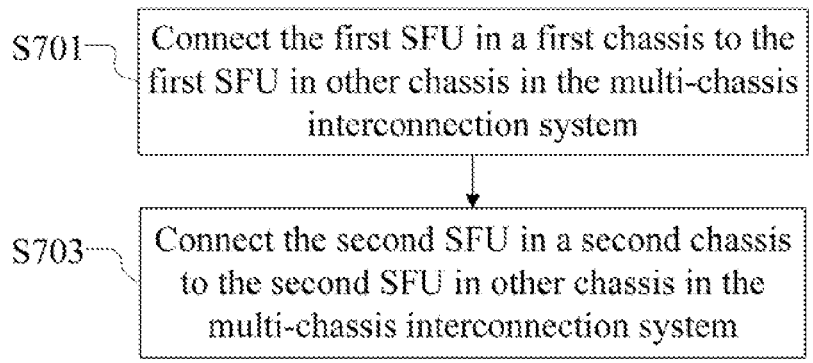
FIG. 5 is a flowchart showing a method for connecting chassis in a multi-chassis interconnection system according to an embodiment of the present invention.

FIG. 5 is a flowchart showing a method for connecting chassis in a multi-chassis interconnection system according to an embodiment of the present invention. As shown in FIG. 5, the method for connecting the chassis in a multi-chassis interconnection system includes the following steps:

Step S501: Connect a first SFU in a first chassis to a first SFU in other chassis in a multi-chassis interconnection system.

In this embodiment of the present invention, the multi-chassis interconnection system includes at least three chassis. Each chassis includes a first SFU and a second SFU that are designed for the external communication of the whole chassis. The first SFU in the first chassis is connected to the first SFU in other chassis in the multi-chassis interconnection system; and the first chassis serves as the first main chassis of the multi-chassis interconnection system.

Step S503: Connect a second SFU in a second chassis to a second SFU in other chassis in a multi-chassis interconnection system.

In this embodiment of the present invention, the second SFU in the second chassis is connected to the second SFU in other chassis in the multi-chassis interconnection system, and the second chassis serves as the second main chassis of the multi-chassis interconnection system.

In this embodiment of the present invention, if the multi-chassis interconnection system includes multiple levels of networks, and each level of network includes multiple chassis, the chassis on different levels of networks may be connected in the following way:

Any two chassis in the level-1 network serve as the first main chassis and the second main chassis of the level-1 network; the first SFU in the first main chassis of the level-1 network is connected to the first SFU in other chassis of the level-1 network; and the second SFU in the second main chassis of the level-1 network is connected to the second SFU in other chassis of the level-1 network.

Any two chassis except the main chassis in the level-1 network serve as the first main chassis and the second main chassis of the level-2 network (the level-1 network includes at least four chassis in this embodiment); the first SFU in the first main chassis of the level-2 network is connected to the first SFU in other chassis of the level-2 network; and the second SFU in the second main chassis of the level-2 network is connected to the second SFU in other chassis of the level-2 network.

By analogy, the chassis in the multi-chassis interconnection system are connected.

According to embodiments of the present invention, backup for the functions of the main chassis is implemented by only changing the mode of interconnection between multiple chassis, the service interruption caused by the fault or maintenance of the main chassis is prevented, and the reliability and maintainability of the system are improved. Meanwhile, two chassis share the work of one main chassis, relieving the load on the main chassis.

The objectives, technical solution and benefits of the embodiments of the present invention are explained in detail in the preceding. Although the invention is described through some exemplary embodiments, the invention is not limited to such embodiments. It is apparent that those skilled in the art may make modifications, equivalent replacements and improvements to the invention without departing from the spirit and scope of the invention. The invention is intended to cover the modifications, equivalent replacements and improvements provided that they fall within the protection scope defined by the following claims or their equivalents.

The invention claimed is:
1. A system for multi-chassis interconnection, comprising at least three chassis, wherein:
   each of the at least three chassis comprises a first switch fabric unit (SFU) and a second SFU;
   the first SFU in a first chassis of the at least three chassis is connected to the first SFU in each of the at least three chassis except the first chassis;
   the second SFU in a second chassis of the at least three chassis is connected to the second SFU in each of the at least three chassis except the second chassis;
   wherein the first SFU in the second chassis is not directly connected to the first SFU in at least one of the at least three chassis other than the first or second chassis, and the second SFU in the first chassis is not directly connected to the second SFU in at least one of the at least three chassis other than the first or second chassis;

wherein:

the system comprises a level-1 network, the level-1 network comprises the at least four chassis, and the first chassis and the second chassis in the at least four chassis are main chassis of the level-1 network;

the system further comprises a level-2 network, and the level-2 network comprises at least three chassis other than the at least four chassis of the level-1 network;

each chassis of the at least three chassis in the level-2 network comprises a first SFU and a second SFU;

any two chassis except the main chassis in the level-1 network serve as a first main chassis and a second main chassis of the level-2 network;

the first SFU in the first main chassis of the level-2 network is connected to the first SFU in each of the at least three chassis of the level-2 network; and the second SFU in the second main chassis of the level-2 network is connected to the second SFU in each of the at least three chassis of the level-2 network.

2. A method for connecting chassis in a multi-chassis interconnection system, wherein the multi-chassis interconnection system comprises at least three chassis, wherein each chassis of the at least three chassis comprises a first switch fabric unit (SFU) and a second SFU, and the method comprises:

connecting the first SFU in a first chassis of the at least three chassis to the first SFU in each of the at least three chassis except the first chassis;

connecting the second SFU in a second chassis of the at least three chassis to the second SFU in each of the at least three chassis except the second chassis;

wherein the first SFU in the second chassis is not directly connected to the first SFU in at least one of the at least three chassis other than the first or second chassis, and the second SFU in the first chassis is not directly connected to the second SFU in at least one of the at least three chassis other than the first or second chassis;

wherein:

the multi-chassis interconnection system comprises a level-1 network, the level-1 network comprises the at least four chassis, and the first chassis and the second chassis are main chassis of the level-1 network;

the multi-chassis interconnection system further comprises a level-2 network, and the level-2 network comprises at least three chassis other than the at least four chassis of the level-1 network, and each of the at least three chassis in the level-2 network comprises a first SFU and a second SFU; the method further comprises:

selecting any two chassis except the main chassis in the level-1 network as a first main chassis and a second main chassis of the level-2 network;

connecting the first SFU in the first main chassis of the level-2 network to the first SFU in each of the at least three chassis of the level-2 network; and connecting the second SFU in the second main chassis of the level-2 network to the second SFU in each of the at least three chassis of the level-2 network.

\* \* \* \* \*